Figure 1:
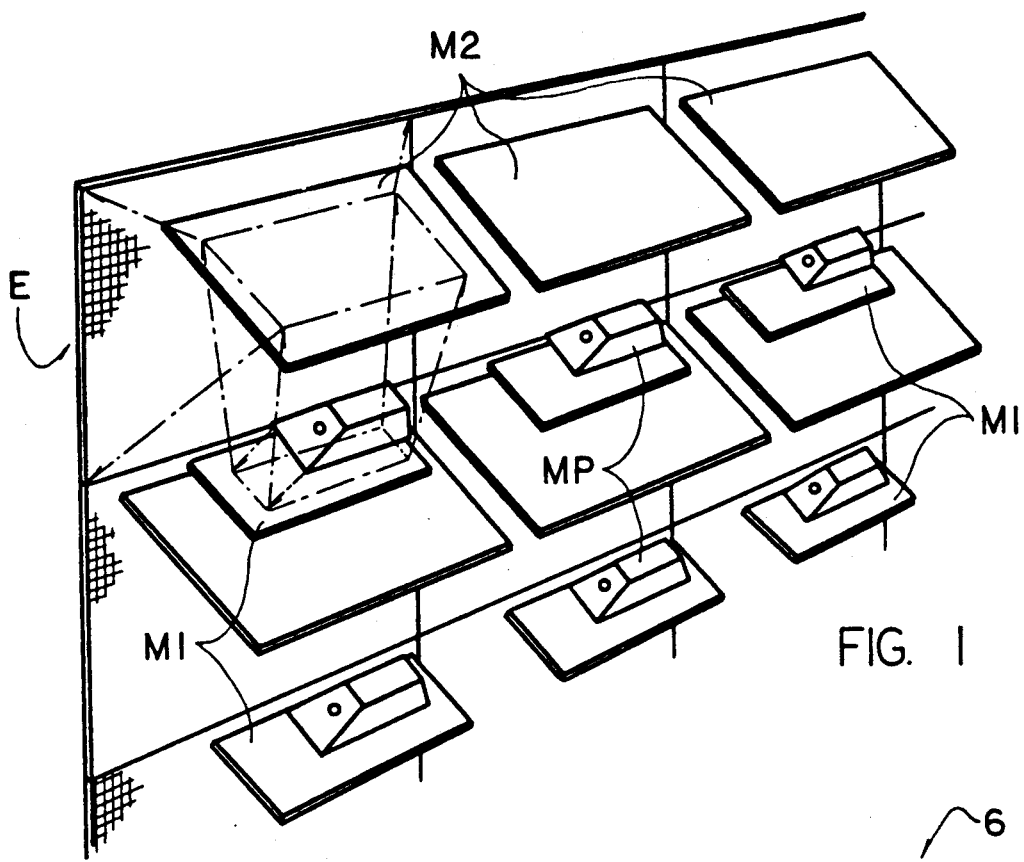

United States Patent [19]

Morin

[11] Patent Number: 5,005,950
[45] Date of Patent: Apr. 9, 1991

[54] GIANT LIQUID CRYSTAL DISPLAY MEANS

[75] Inventor: Francois Morin, Lannion, France

[73] Assignee: Etat Francais Represente Par Le Ministere des Postes, Issy Les Moulineaux, France

[21] Appl. No.: 366,587

[22] Filed: Jun. 15, 1989

[30] Foreign Application Priority Data

Jun. 28, 1988 [FR] France .................. 88 08663

[51] Int. Cl.$^5$ .................. G02F 1/13; H04N 9/31
[52] U.S. Cl. .................. 350/333; 350/334; 350/339 F; 350/338; 358/60; 340/784
[58] Field of Search .................. 350/333, 331 R, 334, 350/338, 339 F; 358/60, 61; 340/784

[56] References Cited

U.S. PATENT DOCUMENTS

| | | | |
|---|---|---|---|
| 2,778,871 | 1/1957 | Muller | 358/60 |
| 3,750,136 | 7/1975 | Roesa | 350/331 R |
| 4,368,963 | 1/1983 | Stolov | 350/334 X |
| 4,562,461 | 12/1985 | Yin | 358/60 |
| 4,613,207 | 9/1986 | Fergason | 350/331 R |
| 4,679,069 | 7/1987 | Andrea et al. | 358/60 |
| 4,791,417 | 12/1988 | Bobak | 340/784 |
| 4,806,922 | 2/1989 | McLaughlin et al. | 340/784 |
| 4,901,155 | 2/1990 | Hara et al. | 358/60 |

FOREIGN PATENT DOCUMENTS

| | | |
|---|---|---|
| 2555859 | 6/1976 | Fed. Rep. of Germany . |
| 3142664 | 5/1983 | Fed. Rep. of Germany . |
| 0030261 | 3/1980 | Japan .................. 358/60 |
| 2024487 | 1/1980 | United Kingdom . |

OTHER PUBLICATIONS

Article in the Journal Funkschau, vol. 59, No. 17, 14.8.1987, pp. 42–46 Munich, H. Martini.
Fergason Patent Cooperation Treaty (PCT) Application WO No. 8505192, 11-21-1985.
Morozumi, Japanese Patent Abstracts, vol. 9, No. 116, P-357, 1839, 21.5.1985 and JPN A-60,2916.

Primary Examiner—Stanley D. Miller
Assistant Examiner—Huy K. Mai
Attorney, Agent, or Firm—Pearne, Gordon, McCoy & Granger

[57] ABSTRACT

Giant liquid crystal display means. The means comprises projection modules (MP) associated with mirrors (M1, M2) and a large screen (E). The screen carries colored filters (R, G, B) and the liquid crystal displays are monochromatic. Application to the projection of large television or pictures.

10 Claims, 2 Drawing Sheets

GIANT LIQUID CRYSTAL DISPLAY MEANS

The present invention relates to a giant liquid crystal display means. It is used in the display of very large images or pictures (several square meters) and which are generally of the color video type. A fortiori, the invention can be used in less demanding fields, such as alphanumeric display, fixed or slowly variable, monochromatic and similar images.

Giant display means can be produced either on the basis of cathode ray tubes, or liquid crystal displays.

The first group includes the Eidophore-type projector, which is based on an oil film tube locally deformed by an electron beam. As a result of its variable birefringence, said oil film leads to a contrast variation in the optical projection beam. The Eidophore is the only system permitting video projection on a very large screen.

More widely adopted are the three-tube video projectors in which red, green and blue images of three very bright cathode ray tubes are projected onto an approximately 1 $m^2$ screen. In addition, cathode ray tube modular panels are becoming widely used in the publicity and commercial display fields.

With respect to the liquid crystal display projectors, a system is known having three displays illuminated respectively in the red, green and blue and having dichroic mirrors with a projection lens.

Finally, certain firms have proposed color liquid crystal modular panels.

However, all these means suffer from disadvantages.

The cathode ray tube assemblies or liquid crystal displays suffer from the disadvantage of having a "black grid" effect due to the junction of the different modules and they are not suitable for high quality display.

Moreover, the liquid crystal display modules suffer from a coloring heterogeneity due to the use of multiple colored mosaic filters (one per screen). As the eye is very sensitive to color variations, the observer generally very clearly distinguishes the coloring variations between the individual modules during the display of isochromatic ranges.

Finally, in color liquid crystal displays used in said modules, the colored filters are located within the cell in order to avoid parallax effects. Therefore they are heated under the strong light flux, which leads to a deterioration in the contrast of the display.

In projection systems using three displays with liquid crystals dedicated in each case to one color, said disadvantage does not exist because on this occasion the monochromatic filter is outside the liquid crystal cell. However, this system suffers from the use of expensive dichroic filters and the efficiency is only mediocre.

Finally, the three-cathode ray tube projectors are only suitable for average sized circuits (approximately 1 $m^2$) and are of mediocre quality due to the fact that the tube image is not spatially fixed. The superimposing of the three colors is generally imperfect.

Only the Eidophore system is appropriate for very large display surfaces, but it suffers from being costly and the need to have a specialized projection cabin.

The present invention aims at obviating these disadvantages. It therefore recommends a means, characterized in that the screen is translucent and comprises a front face directed towards the observer and a rear face having a mosaic of colored filters organized in triads of primary colors and comprises one or more projection modules, each having a white light source, a monochromatic liquid crystal display placed between the source and the rear face of the screen and optical means suitable for the projection of the image of the display onto the rear face of the screen, each display being constituted by pixels, each pixel being projected onto one of the different colored filters supported by the screen.

Although the invention covers the case where only a single projection module is used, it is preferable to juxtapose a plurality of modules arranged in rows and columns, the images corresponding to said various modules being juxtaposed on the screen for forming a single image. Preferably, the liquid crystal display is of the active matrix type and e.g. uses thin film transistors.

Thus, in the means according to the invention, the liquid crystal displays are monochromatic, which obviates the presence of colored filters within the display and consequently the risk of them becoming heated and deteriorating. The colored filters are located on the observation screen. Their realization is facilitated, the constraints linked with the compatibility with the liquid crystals disappearing and it is possible to have larger dimensions (colored elements of approximately 1 $mm^2$ on the projection screen) allowing production by printing.

The projected images can be connected, to within the pixel, as a result of an adjustable mechanical assembly of the projection modules, the connections between the projected modular images then being invisible.

Finally, the system of projecting by the rear leads to autonomous screens which, due to a set of mirrors, can be of limited thickness and therefore have limited overall dimensions.

The invention is described in greater detail hereinafter relative to non-limitative embodiments and the attached drawings, wherein show:

FIG. 1 A diagrammatic perspective view of a means according to the invention.

Figure 2:
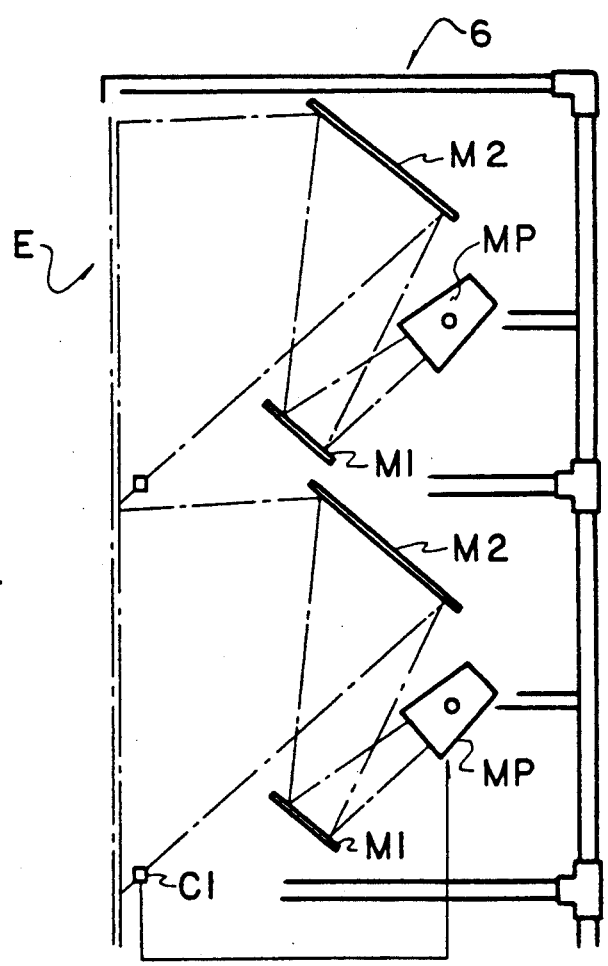

FIG. 2 A side view of a means according to the invention.

Figure 3:
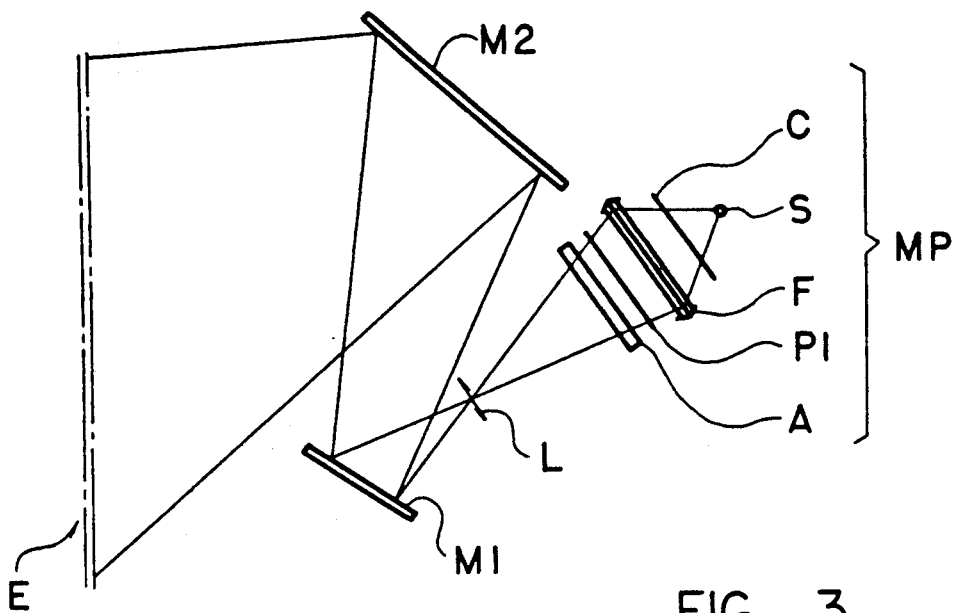

FIG. 3 The structure of a projection module.

Figure 4:
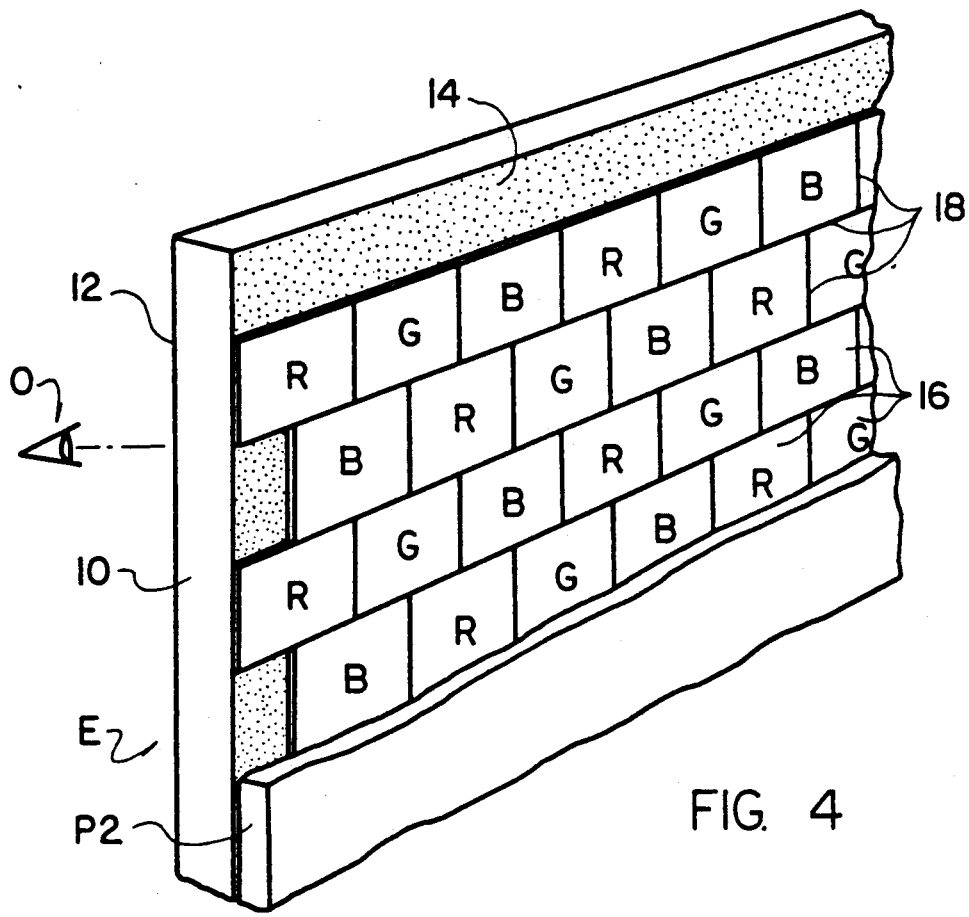

FIG. 4 The rear face of the projection screen.

FIGS. 1 and 2 show a giant display means according to the invention, which comprises a very large screen E, two rows of three projection modules MP, each associated with a first mirror M1 and a second mirror M2. The assembly is carried by a frame 6, which comprises not shown regulating means for the initial adjustment of the different modules with respect to the screen. Optionally a photo-sensitive cell C1 (cf. FIG. 2) measures the light intensity emitted by each module and consequently controls the corresponding module for obtaining the appropriate intensity.

FIG. 3 illustrates in greater detail the structure of a projection module. It is possible to see a white light source S (metal iodide or halogen lamp), an aspherical condenser C, a double Fresnel lens F, a first polarizer P1, a liquid crystal display A and a projection lens L. The display is located in the object focal plane of said lens, the screen E being located in the image plane. The second polarizer P2 is assumed to be engaged against the screen (cf. FIG. 4).

The lamp-condenser-double Fresnel lens assembly serves to illuminate the display A under an obtuse angle, so that all the light passing through it converges in the center of the projection lens L. This leads to the optimization of the efficiency. The projection lens L has an adequate aperture to prevent any chromatic aberration.

The liquid crystal display is preferably of the active matrix type with thin film transistors. A simple process for producing such a display only requiring two masking and etching levels is described in French patent No. 2 533 072. Such a display leads to a high contrast, makes it possible to obtain grey levels and is appropriate for a rate compatible with television signals.

The screen can be in accordance with FIG. 4. It is located in the image plane of the projection lens and is constituted by a transparent support 10 (glass or polycarbonate) having a front face 12 directed towards the observer 0 and a rear face 14. The latter is slightly matte, so as to diffuse the light in a comportable viewing angle (screen gain below 6). On the rear face 14 are deposited mosaics of colored filters 16 in the three primary colors R, G and B (red, green and blue), either using a direct printing process (offset or screen process printing), or by bonding a color film. In order to optimize the contrast (black quality), apart from colored filters, it is possible to produce a black separating grid 18 between the filters and which is known as a black matrix. It is also possible to bond one of the two polarizers P2 to the observation screen, this being necessary for the operation of the liquid crystal displays, where it then also serves to protect the colored filters.

The distribution of the pixels of the liquid crystal display is precisely that of the elementary colored filters of the screen. In the illustrated case, this distribution is "triangular" or staggered. The addressing rows remain horizontal, but the addressing columns have offsets. Thus, each display pixel is precisely projected onto one of the colored filters of the screen. Each display is controlled in such a way that the projected image, which is only intensity modulated, makes the desired image appear in color.

In a purely explanatory manner, it is possible to produce liquid crystal displays of dimensions 7×9 cm with a spacing of 250 μm. It is possible to use a magnification of 10, which leads to 70×90 cm modular images. The screen can comprise filters distributed with a spacing of 2.5 mm and have dimensions 1.4×2.7 m. Thus, there are two rows of three modular images. Such an image consequently comprises 560 rows of 360 triads, i.e. 560×1080 pixels.

I claim:

1. A giant display device comprising a large translucent screen having a front face directed toward an observer and a rear face covered by a mosaic of colored filters organized in triads of primary colors, a liquid crystal display device having a mosaic of pixels, a plurality of optical projection modules comprising a white light source and optical means for projecting an image of said mosaic of pixels of said liquid crystal display device onto said mosaic of colored filters on said rear face of said screen, each pixel of said mosaic of pixels of said liquid crystal display device being optically projected by said optical projection modules on one filter of said mosaic of colored filters.

2. A giant display device according to claim 1, wherein said plurality of optical projection modules are juxtaposed in rows and columns, the images projected by said modules juxtaposed in rows and columns for forming a single image on said screen.

3. A giant display device according to claim 1, wherein said screen is constituted by a transparent support having a matte rear face.

4. A giant display device according to claim 1, wherein said screen comprises on its rear face a black matrix for separating said colored filters.

5. A giant display device according to claim 1, wherein said liquid crystal display device is of the active matrix type.

6. A giant display device according to claim 5, wherein said active matrix display is of the thin film transistor type.

7. A giant display device according to claim 5, wherein said colored filters are distributed in triangular form (R, G, B) and said liquid crystal display device comprises pixels also organized in triangular form.

8. A giant display device according to claim 1, wherein each optical projection module comprises, in front of said light source successively, a condenser, a double Fresnel lens, a first polarizer, a projection lens with an object focal plane in which is placed said liquid crystal display device, a first reflecting mirror, a second reflecting mirror, and a second polarizer, said screen being placed in the image plane of the projection lens.

9. A giant display device according to claim 8, wherein said second polarizer is placed against said rear face of said screen.

10. A giant display device according to claim 1, comprising further means for checking the light intensity projected by each projection module and means for controlling on return said intensity at an appropriate value.

* * * * *